(12) United States Patent
Xu et al.

(10) Patent No.: US 7,370,846 B2
(45) Date of Patent: May 13, 2008

(54) PARALLEL FLOW FRACTIONATION TRAY

(75) Inventors: Zhanping Xu, Amherst, NY (US); Daniel R. Monkelbaan, Amherst, NY (US); Brian J. Nowak, Orchard Park, NY (US); Robert J. Miller, Houston, TX (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 11/550,179

(22) Filed: Oct. 17, 2006

(65) Prior Publication Data

US 2007/0126134 A1 Jun. 7, 2007

Related U.S. Application Data

(62) Division of application No. 11/142,804, filed on Jun. 1, 2005, now Pat. No. 7,204,477.

(51) Int. Cl.
*B01F 3/04* (2006.01)
(52) U.S. Cl. .................. 261/114.1; 261/114.5
(58) Field of Classification Search ... 261/114.1–114.5
See application file for complete search history.

(56) References Cited

U.S. PATENT DOCUMENTS

| | | | | |
|---|---|---|---|---|
| 2,963,872 | A * | 12/1960 | Latimer | 62/643 |
| 3,410,540 | A | 11/1968 | Bruckert | 261/113 |
| 3,417,975 | A | 12/1968 | Williams et al. | 261/114 |
| 3,759,498 | A * | 9/1973 | Matsch | 261/114.3 |
| 4,101,610 | A | 7/1978 | Kirkpatrick et al. | 261/110 |
| 4,496,430 | A * | 1/1985 | Jenkins | 202/158 |
| 4,499,035 | A | 2/1985 | Kirkpatrick et al. | 261/114 JP |
| 4,582,569 | A | 4/1986 | Jenkins | 202/158 |
| 5,047,179 | A | 9/1991 | Nye | 261/114.1 |
| 5,223,183 | A | 6/1993 | Monkelbaan et al. | 261/114.1 |
| 5,244,604 | A | 9/1993 | Miller et al. | 261/97 |
| 5,318,732 | A | 6/1994 | Monkelbaan et al. | 261/114.1 |
| 5,407,605 | A | 4/1995 | Resetarits et al. | 261/98 |
| 5,632,935 | A | 5/1997 | Yeoman et al. | 261/114.1 |
| 6,003,847 | A | 12/1999 | Lee et al. | 261/114.1 |
| 6,371,455 | B1 | 4/2002 | Lee et al. | 261/114.1 |
| 6,460,833 | B2 * | 10/2002 | Konijn | 261/114.1 |
| 6,494,440 | B2 | 12/2002 | Bosmans et al. | 261/114.1 |
| 6,575,438 | B2 | 6/2003 | Nutter et al. | 261/114.1 |
| 6,736,378 | B2 | 5/2004 | Colic et al. | 261/114.1 |
| 6,799,752 | B2 | 10/2004 | Wu et al. | 261/114.2 |
| 7,204,477 | B2 * | 4/2007 | Xu et al. | 261/114.1 |
| 7,232,115 | B2 * | 6/2007 | Sastry | 261/114.1 |
| 2007/0145612 | A1 * | 6/2007 | Konijn et al. | 261/114.5 |

OTHER PUBLICATIONS

Lewis Jr., W.K. Rectification of Binary Mixtures. *Ind. Eng. Chem.* vol. 28:(No. 4), Apr. 1936, pp. 399-402.

* cited by examiner

*Primary Examiner*—Scott Bushey
(74) *Attorney, Agent, or Firm*—David J Piasecki

(57) ABSTRACT

The invention comprises multiple configurations of downcomers in a parallel flow multiple downcomer tray for vapor-liquid contacting processes such as the separation of chemical compounds via fractional distillation or the removal of a component of a gas stream with a treating liquid. In one embodiment, side downcomers are incorporated into a parallel flow multiple downcomer tray. In another embodiment, the downcomers have an inclined side wall that directs liquid onto the deck below the downcomer. The inclined side wall also provides additional volume above the inferior downcomer inlet to reduce pinching at this inlet without the need for a stilling deck.

17 Claims, 12 Drawing Sheets

PARALLEL FLOW FRACTIONATION TRAY

CROSS-REFERENCE TO RELATED APPLICATION

This application is a Division of prior application Ser. No. 11/142,804, filed Jun. 1, 2005 now U.S. Pat. No. 7,204,477, which is incorporated herein by reference in its entirety.

FIELD OF THE INVENTION

This invention relates to vapor-liquid contacting apparatus and specific features that improve the efficiency and capacity of this operation. The invention therefore relates to, for example, apparatus used as fractionation trays within fractional distillation columns. The invention may also be used in a variety of other gas-liquid contacting operations such as acid gas scrubbing or absorption processes.

BACKGROUND OF THE INVENTION

Fractional distillation columns having a number of vertically spaced distillation trays are widely employed in the hydrocarbon processing, chemical, and petrochemical industries. Accordingly, a large amount of research, development, and creative thinking has been devoted to providing improved fractional distillation trays. Fractionation tray development has therefore provided many variations in contacting area structure, downcomer design, and overall tray structure.

Vapor-liquid contacting devices are used in a wide variety of applications for separating liquid or vapor mixtures. One of the major applications of the vapor-liquid contacting devices is in the separation of chemical compounds via fractional distillation. These devices are also used to contact a gas stream with a treating liquid which selectively removes a product compound or an impurity from the gas stream.

Within a column containing vapor-liquid contacting devices, liquid flows in a generally downward direction and vapor rises vertically through the column. On each vapor-liquid contacting device, liquid flows in a generally horizontal direction across the device and vapor flows up through perforations on the device. The cross flow of vapor and liquid streams on each device generates a froth for intimate vapor-liquid contacting and mass transfer.

The apparatus can be used in the separation of essentially any chemical compound amenable to separation or purification by fractional distillation. Fractionation trays are widely used in the separation of specific hydrocarbons such as propane and propylene or benzene and toluene or in the separation of various hydrocarbon fractions such as LPG (liquefied petroleum gas), naphtha or kerosene. The chemical compounds separated with the subject apparatus are not limited to hydrocarbons but may include any compound having sufficient volatility and temperature stability to be separated by fractional distillation. Examples of these materials are acetic acid, water, acetone, acetylene, styrene acrylonitrile, butadiene, cresol, xylene, chlorobenzenes, ethylene, ethane, propane, propylene, xylenols, vinyl acetate, phenol, iso and normal butane, butylenes, pentanes, heptanes, hexanes, halogenated hydrocarbons, aldehydes, ethers such as MTBE and TAME, and alcohols including tertiary butyl alcohol and isopropyl alcohol.

One important issue in the field of vapor-liquid contacting columns is improving the capacity of the trays to allow vapor and liquid to flow from tray to tray without flooding.

A second important issue in the field is improving the efficiency of the trays for mass transfer between vapor and liquid.

In a well-known classic study by W. K. Lewis in 1936, it was found that the mass transfer efficiency of vapor-liquid contacting trays could be maximized by bringing an unmixed vapor into contact with liquid flows across each successive tray in the same direction (Case 2). The Case 2 is referred to as a parallel flow, which, as used herein, refers to liquid flows on vertical adjacent or successive trays rather than to liquid flows on a single tray. Lewis' Case 2 ensures that the driving force for mass transfer on a given tray is nearly the same regardless of where that mass transfer occurs on the tray. Because of this, substantial increases in efficiency can be obtained when using a tray operated according to Lewis' Case 2.

U.S. Pat. No. 5,223,183 to Monkelbaan, et al. teaches a parallel flow tray with at least one central downcomer and no side downcomers. The downcomers of each tray are aligned with the downcomers on the other trays of the column such that the downcomers on one tray are immediately below those on the tray above. The outlets of one downcomer are directly above the inlet of another. A pair of inclined liquid deflecting baffles over each downcomer connects the outlets and inlets of vertically adjacent downcomers and provides a crisscrossing liquid flow path. The downcomer baffles prevent liquid from the tray above from entering each downcomer and define the direction of liquid flow onto the tray deck. The inclined surface of the baffle also imparts a horizontal momentum to the descending liquid which tends to push the liquid and froth present on the tray towards the inlet of the outlet downcomer for this portion or zone of the tray. In certain designs of the trays there is provided a perforated anti-penetration weir on the lower end of the downcomer baffles, with the weir being perpendicular to the downcomer baffle. Further, froth flow into an outlet downcomer is pinched by the downcomer right above, which may reduce tray capacity.

U.S. Pat. No. 5,318,732 to Monkelbaan, et al. teaches another parallel flow multiple downcomer type fractionation tray, which increases tray capacity by providing imperforate stilling decks that extend across the tray deck surface outward from the downcomer inlet opening together with vertical inlet weirs attached to the outer end of the stilling decks. The inlet weirs may function as pre-weirs used in addition to the conventional inlet weir formed by the upward extension of the downcomer side wall. Further, the stilling decks help reduce pinching; however they also reduce the active area of the deck.

Therefore an improved high-capacity tray providing a Lewis Case 2 parallel flow pattern is needed in the art.

SUMMARY OF THE INVENTION

Two determinants of the quality of a contacting tray are its efficiency for performing a process and its capacity in terms of liquid or vapor traffic. It is an objective of the subject invention to increase the efficiency of contacting trays with Lewis Case 2 vapor-liquid contacting arrangement. It is another objective of the invention to provide a vapor-liquid contacting apparatus with improved capacity.

The invention comprises multiple configurations of a parallel flow multiple downcomer tray for vapor-liquid contacting processes such as the separation of chemical compounds via fractional distillation or the removal of a component of a gas stream with a treating liquid. In one embodiment, side downcomers are incorporated into a parallel flow multiple downcomer tray having a center baffle. In another embodiment, the downcomers have an inclined side wall that directs liquid onto the deck below the downcomer. The inclined side wall also provides additional volume above the inferior downcomer inlet to reduce pinching at this inlet without the need for a stilling deck. In a further embodiment, features of the first two embodiments are combined.

More particularly, the invention comprises, in one form thereof, a vapor-liquid contacting tray that includes at least one centrally located downcomer. The vapor-liquid contacting tray further includes a means to define vertical liquid flow paths for liquid flowing through each central downcomer onto a subsequent tray that comprises an inclined downcomer baffle. A plurality of vapor-liquid contacting decks is included on the tray. Two side downcomers are included proximate to the outer perimeter of the tray. Each side downcomer has a liquid receiving portion and a liquid distributing portion wherein the receiving portion directs liquid to the distributing portion and the distributing portion is substantially sealed against fluid entering directly from a proximate contacting deck. A central baffle extends between at least two of the downcomers and intersects at least one of the contacting decks.

In another embodiment, the invention comprises a vapor-liquid contacting tray that has a generally circular circumference and includes a plurality of central downcomers that are formed by a first elongate side wall and an opposing second elongate side wall extending a shorter vertical distance below a proximate contacting deck than the first elongate side wall. Each downcomer further includes a bottom plate that intersects the first elongate side wall. The vapor-liquid contacting tray further includes a means to define vertical liquid flow paths for liquid flowing through each downcomer onto a subsequent tray comprising an inclined downcomer baffle, wherein the downcomer baffle extends from the second elongate side wall, intersects the bottom plate, and extends at least to a vertical plane formed by the first elongate side wall. A plurality of vapor-liquid contacting decks is included on the tray. A central baffle extends between at least two of the plurality of downcomers and intersects at least one of the contacting decks.

A further form of the invention comprises a vapor-liquid contacting tray that includes at least one centrally located downcomer, a means to define vertical liquid flow paths for liquid flowing through each central downcomer onto a subsequent tray comprising an inclined downcomer baffle, and a plurality of vapor-liquid contacting decks. A bubble promoter, which comprises a perforated plate, is situated on the tray to direct liquid from the inclined downcomer baffle to one of the contacting decks. A central baffle extends between at least two of the downcomers and intersects at least one of the contacting decks.

An even further form of the invention comprises a vapor-liquid contacting tray that includes a plurality of vapor-liquid contacting decks and two side downcomers proximate to the outer perimeter of the tray. Each side downcomer has a liquid receiving portion and a liquid distributing portion wherein the receiving portion directs liquid to the distributing portion. A cover is included over the liquid distributing portion that prevents liquid from a superior side downcomer from entering the liquid distributing portion. The cover also directs vapor in the liquid distributing portion to a vapor flow path outside the perimeter of the tray.

A still further form of the invention comprises a vapor-liquid contacting tray that has a generally circular circumference and includes at least one centrally located downcomer, a plurality of vapor-liquid contacting decks, and two side downcomers proximate to the outer perimeter of said tray. Each side downcomer has a liquid receiving portion and a liquid distributing portion wherein the receiving portion directs liquid to the distributing portion. A central baffle extends between at least two of the downcomers and intersects at least one of the contacting decks. The central baffle comprises a bend proximate to each of the side downcomers, which increases the size of the liquid receiving portions.

The invention further comprises a central downcomer for a vapor-liquid contacting tray, having a first portion and a second portion, which is substantially a mirror image of the first portion. Each of the first and second portions include a first elongate side wall, an opposing second elongate side wall extending a shorter vertical distance below the proximate contacting deck than the first elongate side wall, a bottom plate that intersects the first elongate side wall, an inclined downcomer baffle that extends from the second elongate side wall, and an extension flange. The first and second portions fit together such that each of the extension flanges overlaps with the complimentary inclined downcomer baffle and second elongate side wall. In a particular embodiment, each of the first and second portions is made from a single sheet of material. The central downcomer may further include cross braces between the first and second elongate side walls of each portion.

BRIEF DESCRIPTION OF THE DRAWINGS

The above-mentioned and other features and advantages of this invention, and the manner of attaining them, will become apparent and be better understood by reference to the following description of several embodiments of the invention in conjunction with the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
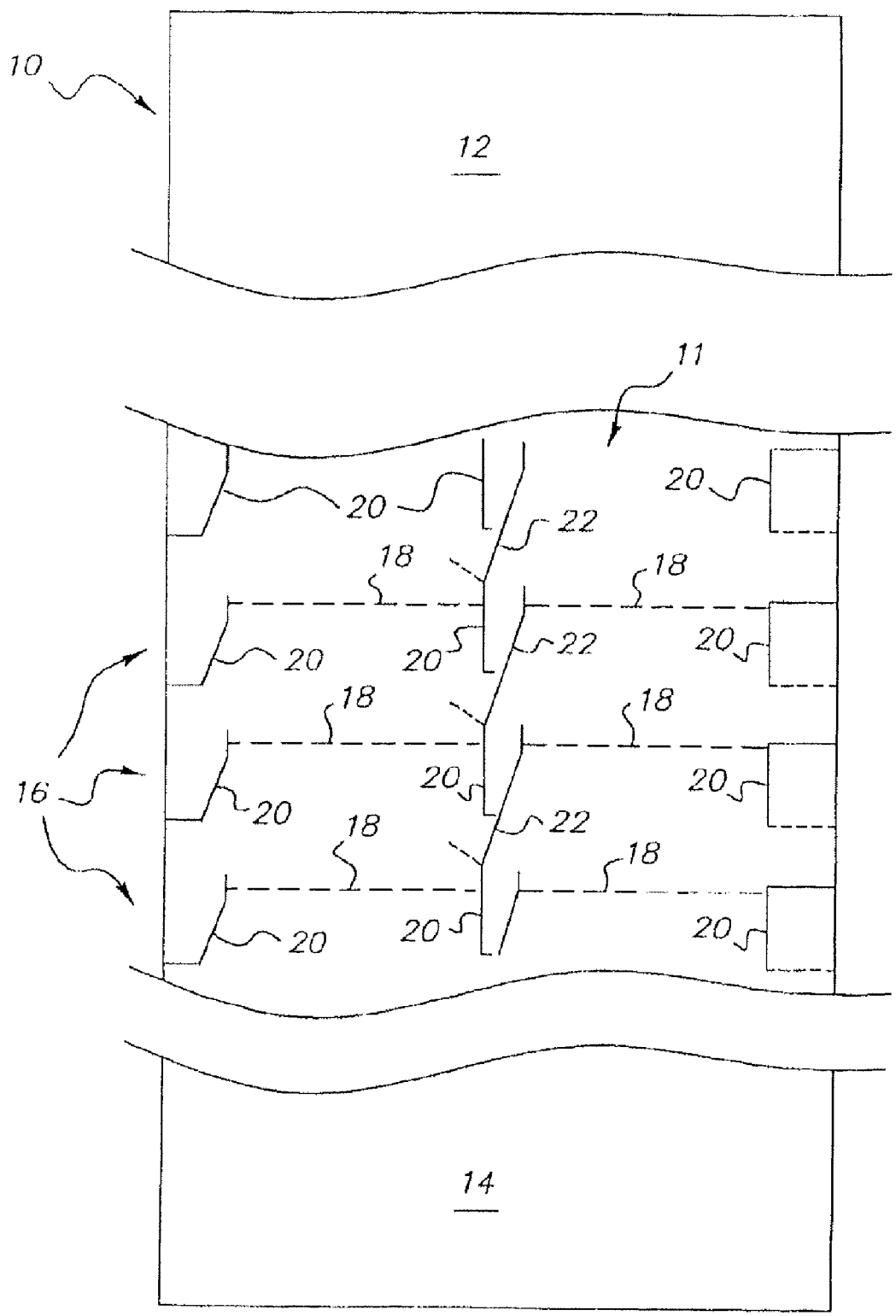
FIG. 1 is a schematic view of a vapor-liquid contacting column having a plurality of vapor-liquid contacting trays according to the present invention.

Referring to FIG. 1, there is shown an example of a vapor-liquid contacting column having a plurality of vapor-liquid contacting trays of the present invention. The details of the trays will be disclosed in the subsequent embodiments of the invention. The column 10 includes a cylindrical inner chamber 11, a top section 12, a bottom section 14, and a plurality of vapor-liquid contacting trays 16 having a circular perimeter. The top section 12 collects vapor from the chamber 11 and supplies liquid to the chamber 11. In certain applications, such as continuous fractionation, the top section 12 is in fluid communication with a condenser that condenses the vapor and adds a portion of the resultant liquid to the liquid supply to the chamber 11. The bottom section 14 collects liquid from the chamber 11 and supplies vapor to the chamber 11. Similar to the top section 12, in certain applications, such as continuous fractionation, the bottom section 14 is in fluid communication with a reboiler that converts a portion of the liquid to vapor, which is added to the vapor supply. The column 10 may also include one or more intermediate feeds that adds a liquid or vapor mixture to the middle of the column 10 with some trays 16 above the feed and some trays 16 below the feed. Each tray 16 comprises a contacting deck 18, at least one downcomer 20, and at least one inclined downcomer baffle 22.

Figure 2:
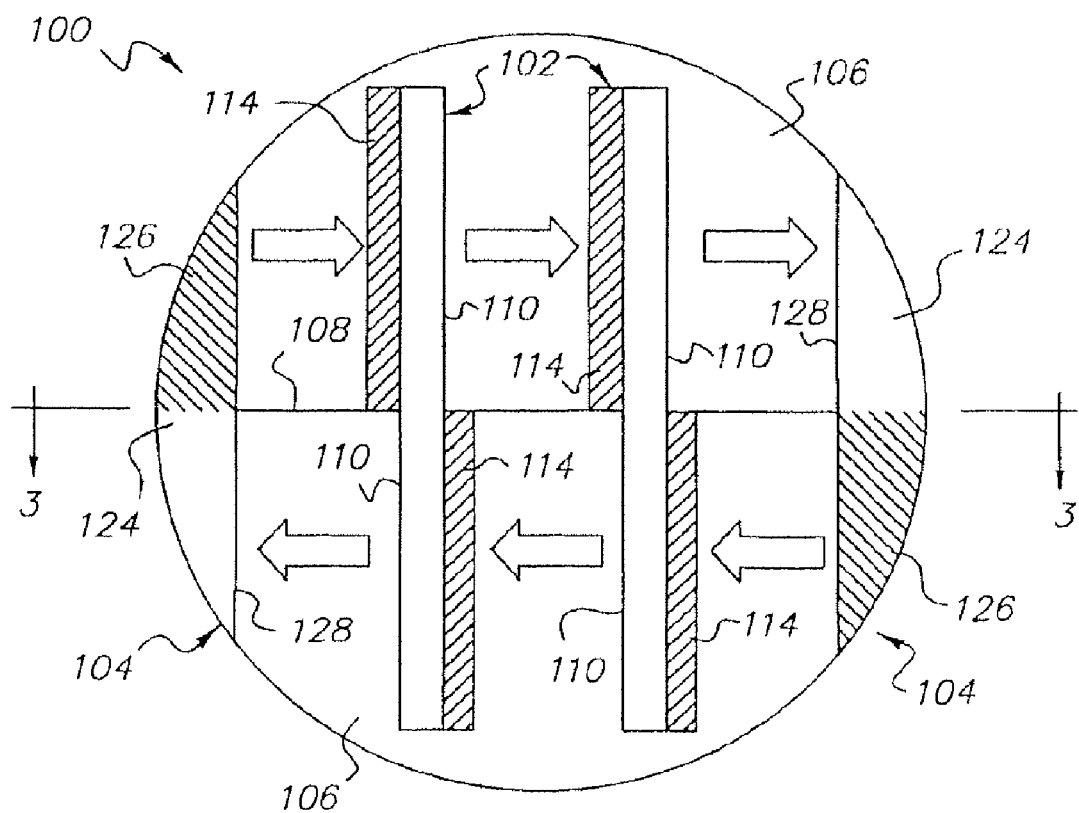
FIG. 2 is a schematic plan view of the first embodiment of the parallel flow multiple downcomer fractionation tray of the present invention.
Figure 3:
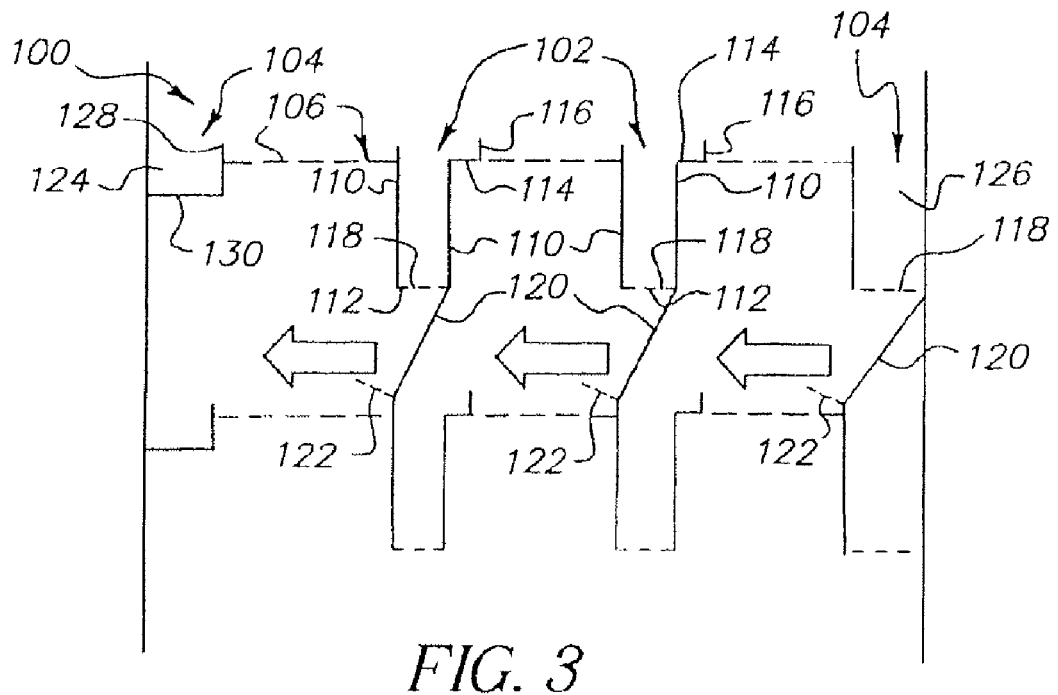
FIG. 3 is a schematic cross-sectional view of a column of trays according to FIG. 2.

A particular embodiment of the invention shown in FIGS. 2 and 3 includes a plurality of parallel flow multiple downcomer fractionation trays 100 having at least one central downcomer 102 and two side downcomers 104. Between each two downcomers 102 and 104, each tray 100 includes active areas in the form of a perforated deck 106. The deck 106 is bisected by central baffle 108.

The central downcomer 102 includes side walls 110, a bottom plate 112, stilling decks 114, and inlet weirs 116. The flat, horizontal bottom plate 112 extends between the side walls 110. A number of openings 118 are provided in the bottom plate for the exit of the liquid which accumulates within the central downcomer 102. The purpose of the bottom plate 112 is to retard the liquid flow sufficiently that the bottom of the central downcomer 102 is dynamically sealed by liquid to the upward passage of vapor. The openings may be circular, square or elongated in either direction, that is, along the width or length of the central downcomer 102. The sealing of the downcomer outlet to upward vapor flow could be accomplished by other structures as well. The stilling decks 114 are imperforate, and thus inactive, regions just prior to the inlets of each central downcomer 102. The combination of the inlet weir 116 and the stilling deck 114 helps prevent pinching by providing an area near the inlet of the central downcomer 102 that doesn't add vapor to the froth.

The central downcomers 102 may be supported by any conventional means such as a support ring, not shown, which is welded to the inner surface of the column wall. The deck 106 may be supported, for example, by an angle-iron support welded to the side walls 110 and the support ring welded to the column wall. The central downcomers 102 and the deck 106 are bolted, clamped, or otherwise affixed to the supports so that the central downcomers 102 and the deck 106 are kept in position during operation. The central downcomers 102 may act as the main supports for the tray 100; however, additional support beams may need to be included for substantially large trays. Further, strengthened central downcomers may be used.

An inclined baffle 120 is situated between the bottom of a central downcomer 102 and the top of a central downcomer 102 immediately below it. It may be seen that the inclined baffles 120 extend between the central downcomers 102 in such a manner that liquid may not travel horizontally over the central downcomer 102 from one decking surface 106 to another. Liquid descending from one central downcomer 102 is prevented from falling into the next lower central downcomer 102 and must flow horizontally across the decking 106 to a different downcomer, whether it's a side downcomer 104 as shown in FIG. 3, or another central downcomer 102 in order to proceed to the subsequent tray. In this embodiment two inclined baffles 120 cover the inlet of each central downcomer 102. The inclined baffles 120 have opposite slopes that deliver liquid onto deck portions 106 on different sides of the central downcomer 102 such that the liquid flows in the direction of the arrows. In this embodiment the inclined baffles 120 on one side of the tray 100 all slope in the same direction, and the inclined baffles 120 on the other side (or other half) of the column face in the opposite direction. Liquid therefore flows in the opposite direction on the two sides of any one tray 100, but flows in the same direction (parallel flow) on all deck areas 106 on one side of each tray 100. A perforated anti-penetration or distribution weir 122 may be situated at the bottom of each of the inclined baffles 120. In the present embodiment, the distribution weir 122 is inclined for 0 to 90 degrees, preferably about 45 degrees, to horizontal.

The side downcomers 104 are provided to improve the fluid handling at the sides of the tray 100. Each of the downcomers 104 includes a receiving portion 124 and a distribution portion 126. The receiving portion 124 includes a side weir 128 and an imperforate, sloped bottom plate 130, which is oriented to direct liquid towards the distribution portion 126. The distribution portion 126 includes a bottom plate 112 as described above with the central downcomers 102. An inclined baffle 120 and distribution weir 122 are situated below the distribution portion 126.

The deck 106 is perforated to allow vapor to flow through the deck 106 and contact the fluid on the deck 106. The perforations may take many forms including evenly spaced, circular holes and a number of vapor-directing slots. The slots are oriented such that the vapor rising upward through the deck 106 through these slots imparts a horizontal thrust or momentum to the liquid or froth on the tray 100 in the direction of the nearest outlet downcomer. There is therefore achieved a more rapid passage of the froth into the downcomer means and a decrease in the froth height on the tray. More importantly by proper slot arrangement liquid flows uniformly across deck 106 into downcomer means. These slots and their function may resemble those described in U.S. Pat. No. 4,499,035, which is incorporated herein by reference. U.S. Pat. No. 3,417,975 issued to B. Williams et al. provides representations of a portion of decking material having both circular perforations and flow directing slots. This patent is also incorporated herein for its teaching as to the design and usage of flow directing slots.

Figure 4A:
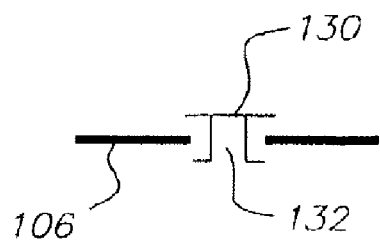
FIGS. 4A and 4B are schematics of a floating valve.
Figure 4B:
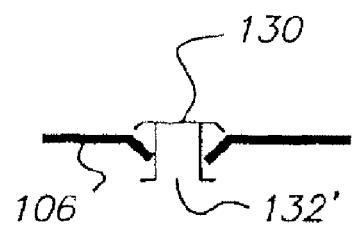

FIG. 4A is an enlarged schematic view of an alternate flow opening within the deck 106. Deck 106 has valve 130 in opening 132. FIG. 4B is an alternative flow opening with a venturi type opening 132' created by extrusion or pressing of the deck 106. Valve 130 is inserted into venturi opening 132' of deck 106.

At the midpoint of each downcomer, a central baffle 108 rises upward from each deck area 106 of the overall tray surface. This central baffle 108 may be formed from a number of connecting plates or a single plate. The central baffle 108 prevents liquid and froth present on the two sides of the central baffle 108 from admixing. The central baffle 108 terminates a short distance below the next higher tray to provide a gap which allows pressure and vapor flow equalization. The central baffle 108 optionally includes equalization ports in the middle of the deck, remote from the downcomers as described in a subsequent embodiment with reference to FIGS. 9A and 9B.

Figure 5:
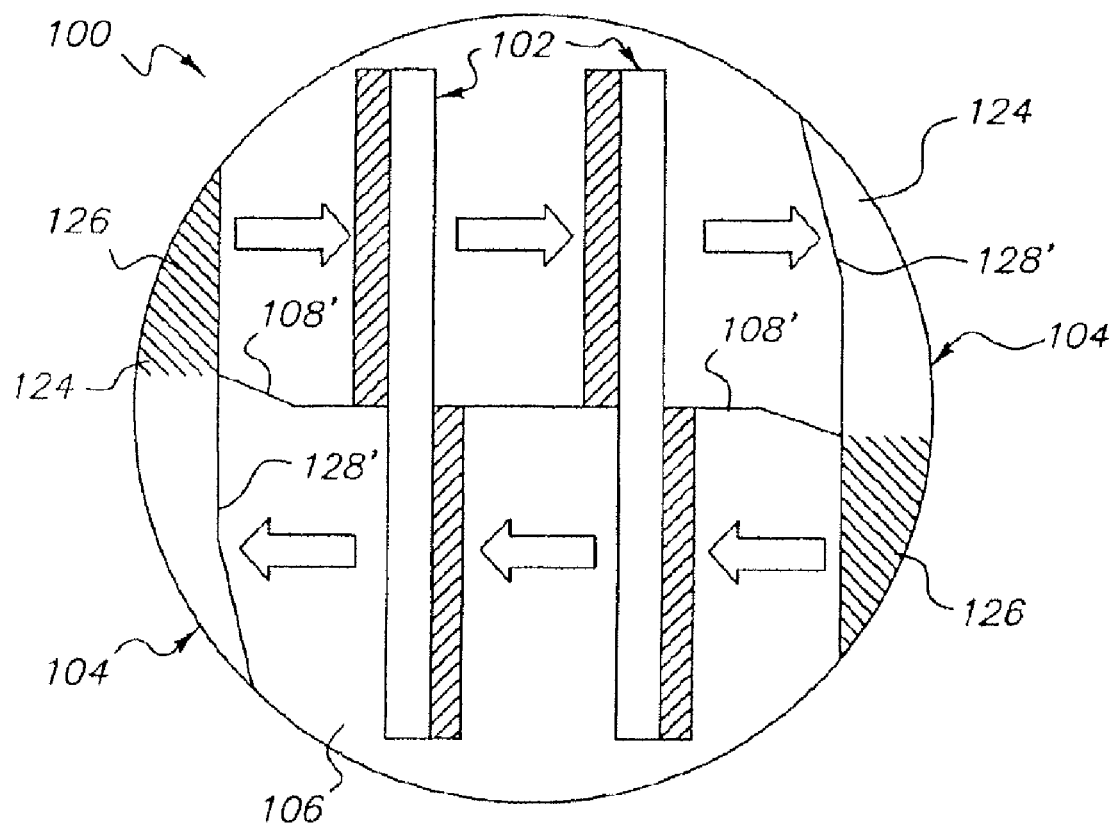
FIG. 5 is a schematic plan view of the tray of FIG. 2 having a swept-back side weir and a bent center baffle.

As one can see with reference to FIGS. 2 and 3, the side weirs 128 are significantly shorter than the inlet weirs 116 associated with the inlets to the central downcomers 102. This may limit the capacity of the tray 100 because of more liquid accumulation on the deck 106 proximate to the inlet of a side downcomer 104 than proximate to the inlet of a central downcomer 102. A swept-back side weir 128', a swept back central baffle 108', or both, as shown in FIG. 5, cooperate with a side downcomer that is unequally divided between a receiving portion and a distributing portion to increase the length of the side weir thereby reducing the difference in weir loads between the side downcomers 104 and the central downcomers 102. Also importantly, the use of swept-back weir 128' and the swept-back central baffle 108' increases the entrance space of the side downcomer 104, and therefore, reduces downcomer choking tendency. Thus the capacity of the side downcomer 104 is increased so that it is substantially equal to the capacity of the central downcomers 102. As shown in FIG. 3 the column wall may serve as a side wall of the side downcomers. In other embodiments two side walls may define the distribution portion and/or receiving portion with one of the side walls conforming to shape of the column in an abutting or spaced-apart relationship therewith.

Figure 6:
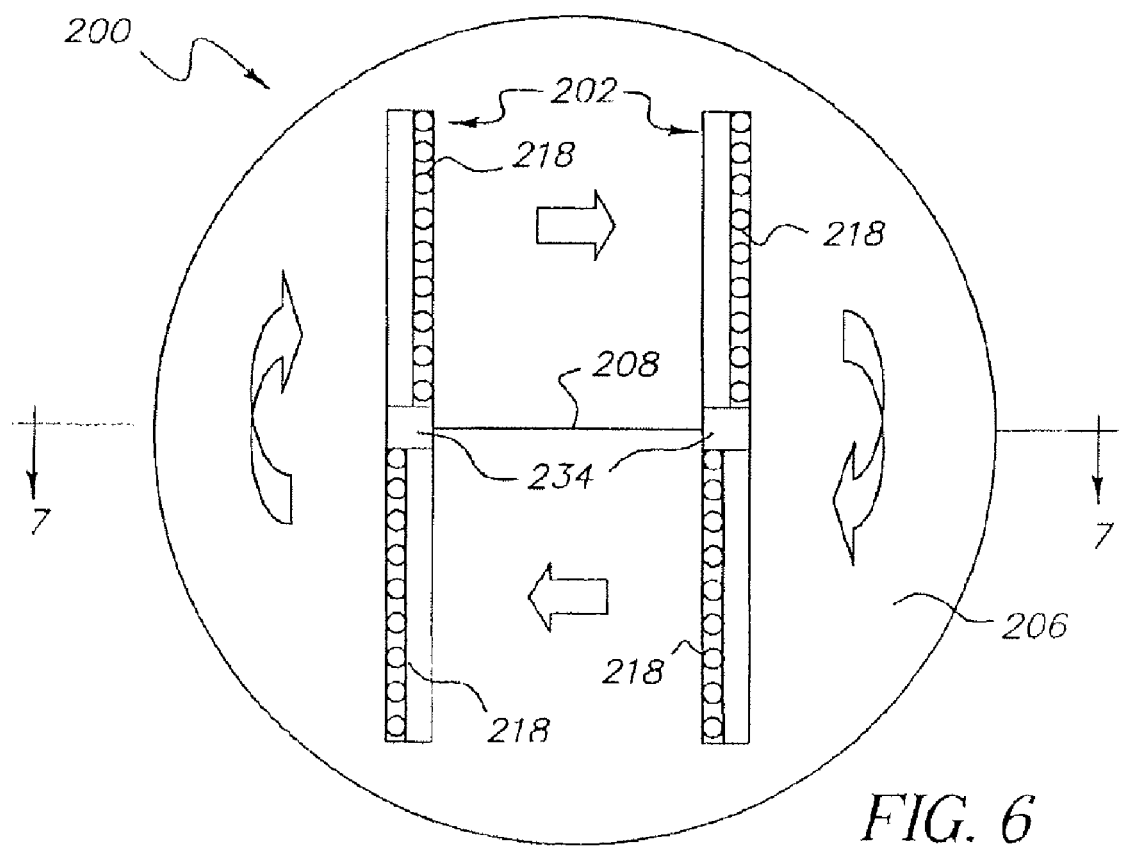
FIG. 6 is a schematic plan view of the second embodiment of the parallel flow multiple downcomer fractionation tray of the present invention.
Figure 7:
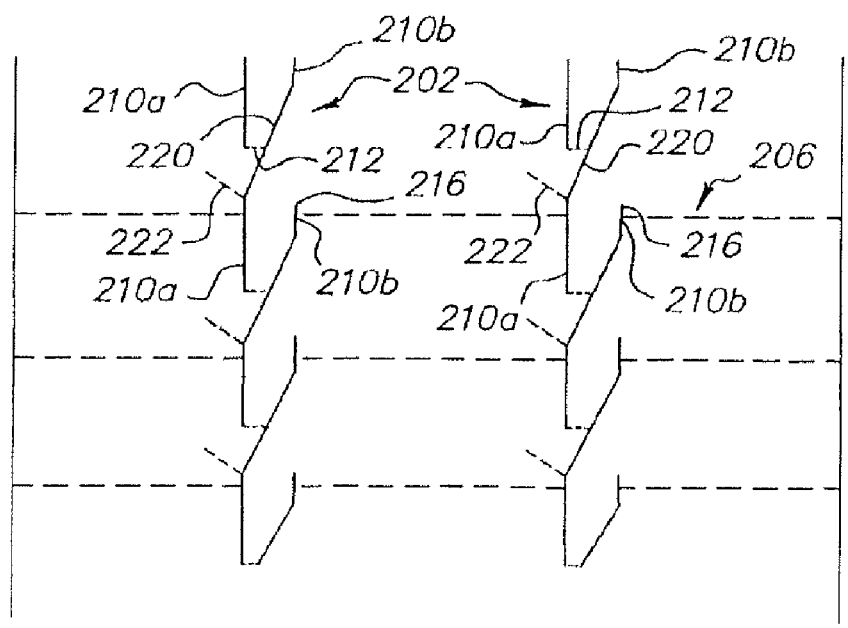
FIG. 7 is a schematic cross-sectional view of a column of trays according to FIG. 6.

A second embodiment of the invention, shown in FIGS. 6 and 7, includes a tray 200 having at least one central downcomer 202. Each central downcomer 202 includes a side wall 210a, a shortened side wall 210b, a bottom plate 212, an inlet weir 216 defined by the portion of side wall 210b above the deck 206, a liquid balancing box 234, and an inclined baffle 220 with an anti-penetration weir 222. The bottom plate 212 includes openings 218 for the exit of the liquid which accumulates within the central downcomer 202. In this embodiment, the inclined baffle 220 is incorporated into one side wall 210b to form a sloped downcomer that provides additional volume above the inlet to the central downcomer 202. The extension of the shortened side wall 210b below the decking can improve tray strength and aid in supporting the decking. However, extension of the shortened side wall 210b below the decking is not required. Thus, if the first side wall extends below the decking and the second side wall does not extend below the decking, the requirement in this embodiment that the second elongate side wall extends a shorter distance below the decking than the first elongate side wall is still satisfied. The additional volume prevents pinching of liquid and froth flow over the inlet without the need for a stilling deck 114 as shown in FIGS. 2 and 3. The liquid balancing box 234, which may be located in the middle of the central downcomer 202, facilitates liquid communication between the two portions of each central downcomer 202, which are sloped in different directions. This feature promotes the balancing of the liquid flow in the case that one side of the central downcomer 202 has a higher liquid input or output than the opposite side. The deck portions 206 are similar to deck portions 106 described in the previous embodiment. Further, the central baffle 208 is similar to the central baffle 108 described in the previous embodiment. In another embodiment not shown, the central baffle extends beyond at least one of the downcomers towards the periphery of the tray. This extension of the central baffle ensures a more uniform residence time on the decking located adjacent the perimeter of the tray.

Figure 8A:
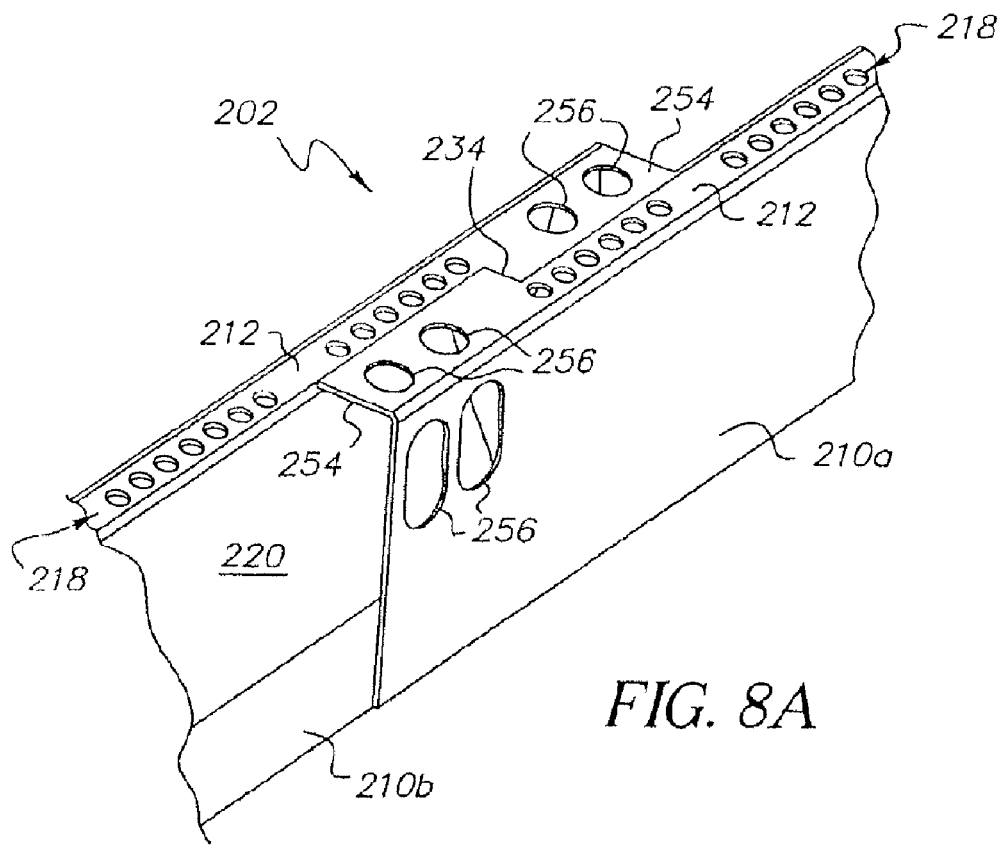
FIG. 8A is a bottom isometric view of a strengthened central downcomer.
Figure 8B:
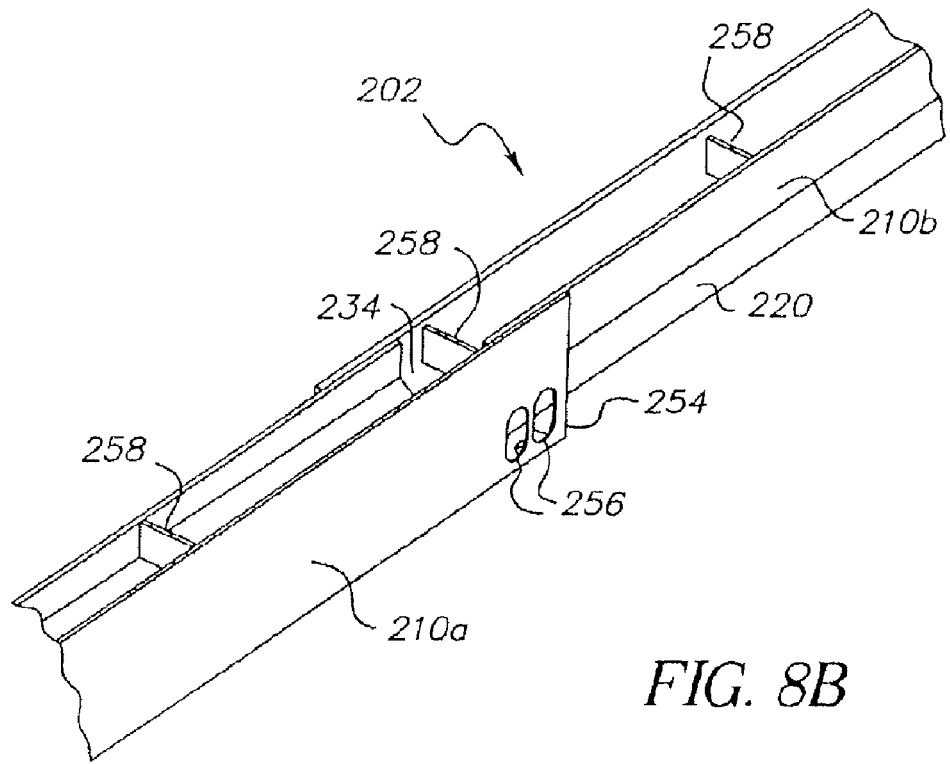
FIG. 8B is a top isometric view of the strengthened central downcomer of FIG. 8A.

As described in the first embodiment, strengthened central downcomers may be used for additional support for the tray 100. The central downcomers may provide the majority of the support for the contacting tray 200 and since tray efficiency is increased with fewer central downcomers, strengthened central downcomers 202 may be needed. Strengthened central downcomers 202, as shown in FIGS. 8A and 8B, may be made with two pieces (one with an inclined baffle 220 slanted one way and the other slanted in the opposite direction). Each piece may be made mostly of a single sheet of material that is cut and bent into shape. Thus there are as few joints as possible. The pieces each have a flange 254 that overlaps with the shortened side wall 210b and the inclined baffle 220 of the opposite piece and cooperates to form a strong joint between the two pieces and also to form a modified liquid balancing box 234 that facilitates fluid transfer between the downcomer sections. The flanges 254 distribute the stress on the joint between the two downcomer pieces and include several slots 256 for liquid flow. Holes are not placed near high stress areas. The top edge of the strengthened central downcomer 202 is folded over and welded for additional strength. Further, cross braces 258 may be included to increase lateral stability of the downcomer and, thus, increase the downcomer strength. In certain embodiments with a substantially large contacting tray (such as those having a diameter of over 16-ft), structural I-beams may be used for additional support for the deck 206 while limiting the adverse affect on tray efficiency that additional downcomers may cause.

Figure 9A:
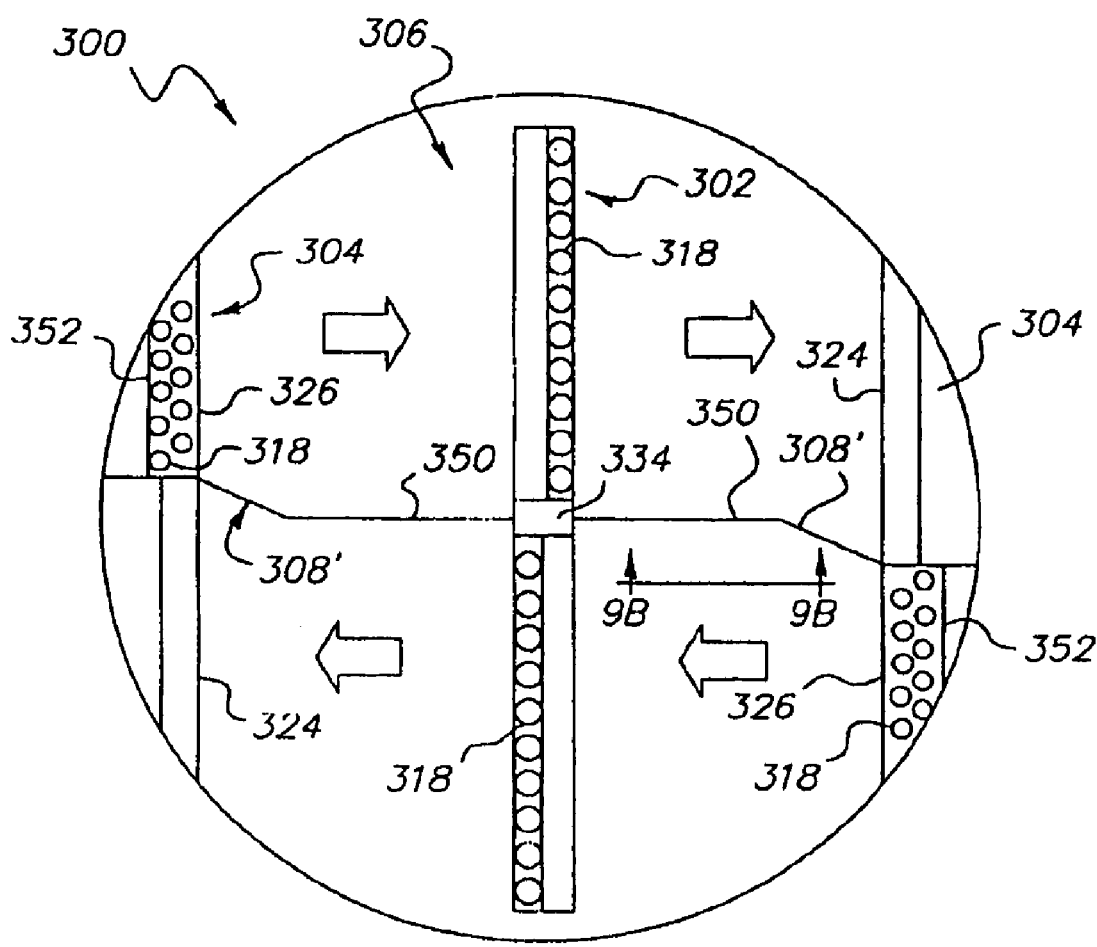
FIGS. 9A-14 are various schematic views of the third embodiment of the parallel flow multiple downcomer fractionation tray of the present invention.
Figure 10:
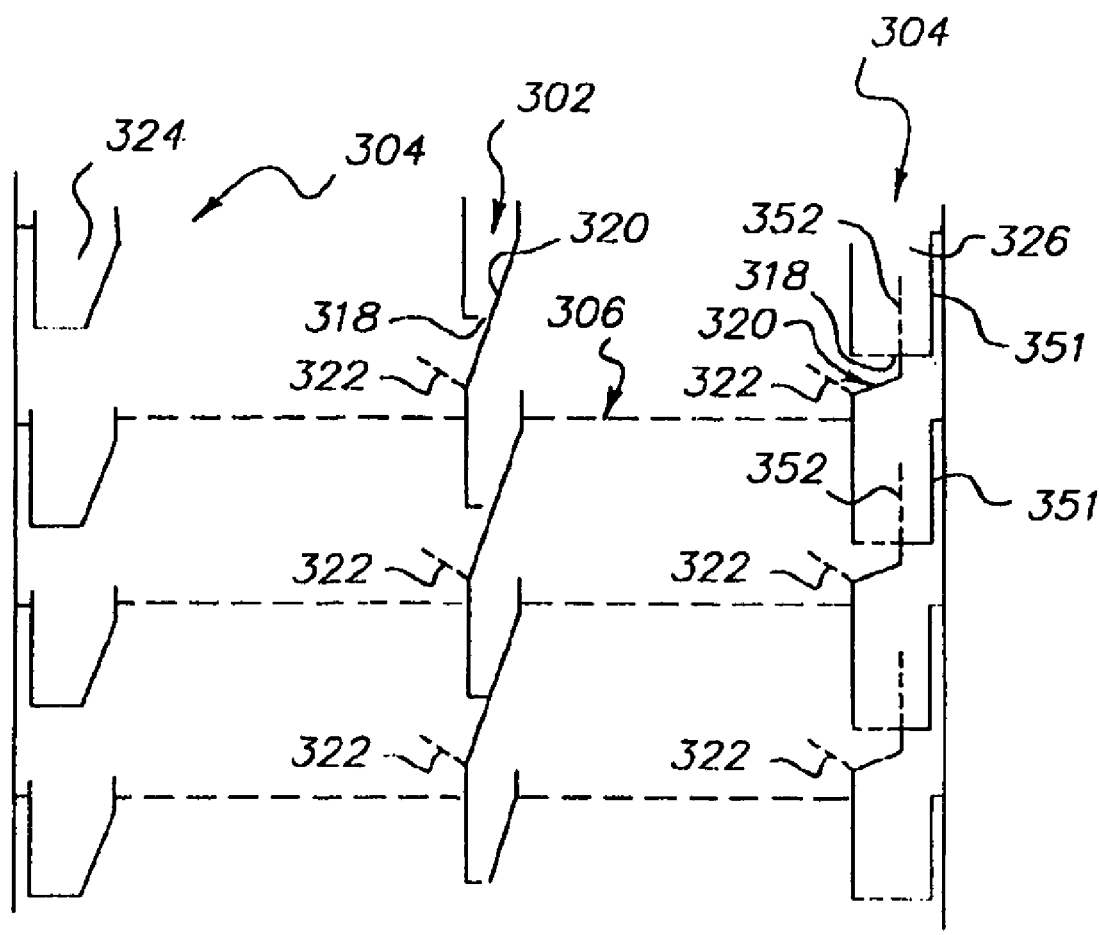
Figure 11A:
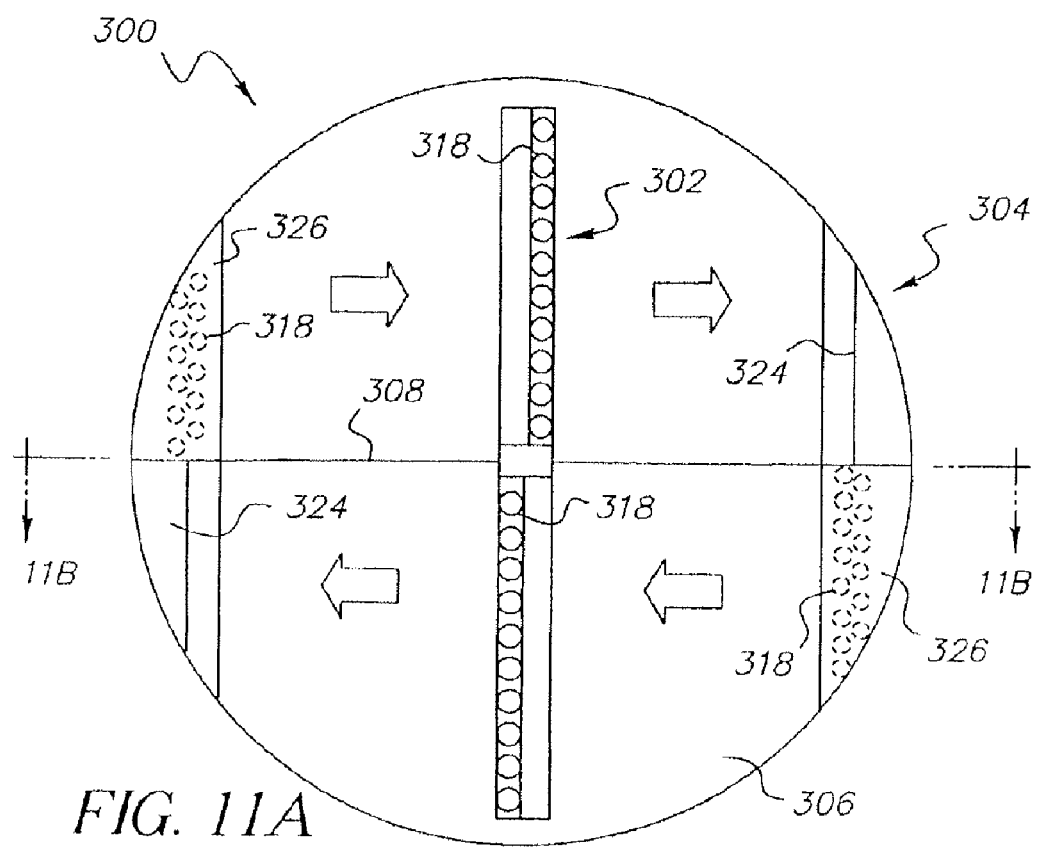

In order to improve the flow of the liquid around the sides of the tray 200 and increase tray capacity, a third embodiment of the invention combining the first two embodiments is presented. Multiple downcomer trays 300 are shown in FIGS. 9A and 10. The tray 300 includes at least one central downcomer 302, each of which is similar in structure to the central downcomer 202, and side downcomers 304. The side downcomers 304 are similar in structure to the side downcomers 104 except that the side downcomers 304 may incorporate a sloped side wall to reduce pinching. More particularly, the tray 300 includes a central downcomer 302 with a liquid balancing box 334, side downcomers 304, a deck 306, and a swept-back center baffle 308' similar to the center baffle 108' described in the first embodiment. The tray 300 may alternatively include a straight center baffle 308, as shown in FIG. 11A. The central downcomer 302, as well as the side downcomers 304 include an inclined downcomer baffle 320 with anti-penetration weirs 322. The central downcomer 302 and the side downcomers 304 also include a bottom plate 312 and openings 318. The side downcomers 304 further include a receiving portion 324 and a distribution portion 326.

Figure 9B:

The center baffle 308' also includes equalization ports 350 as best seen in FIG. 9B. The equalization ports 350 allow balancing of the liquid flows between the sides of the deck 306 divided by the swept-back center baffle 308'. The equalization ports 350 should be kept remote from the downcomer inlets and outlets so they do not form a shortcut for the liquid to flow from an outlet to an inlet without flowing over the majority part of deck 306. Further, the vapor-liquid mixture is similar on both sides of the baffle 308' in the middle of the deck 306, remote from the downcomers, whereas the areas proximate to the downcomers have different vapor-liquid compositions on either side of the baffle 308'. Particularly, one side of the baffle 308' is proximate a downcomer outlet, while the opposite side of the baffle 308' is proximate a downcomer inlet. The equalization ports 350 may also be used in conjunction with the straight center baffle 308.

Vapor may enter the receiving portion 324 with the liquid in the form of froth. Therefore, it may be necessary to include an outlet path for the vapor in the distribution portion 326 to prevent choking. As shown in FIG. 10, the outlet path above the distribution portion 326 includes a side wall 351 to prevent liquid from entering and directs the vapor between the side downcomer and the outer perimeter of the tray, that is, along the inner wall of the column. The flow path may continue along the outer wall of the column to the top of the column or the vapor may be vented below a deck portion 306 of a superior tray. A momentum dampening device 352 may be installed in the distribution portion of the side downcomers to reduce the flow momentum of liquid from the receiving portion.

Figure 11B:
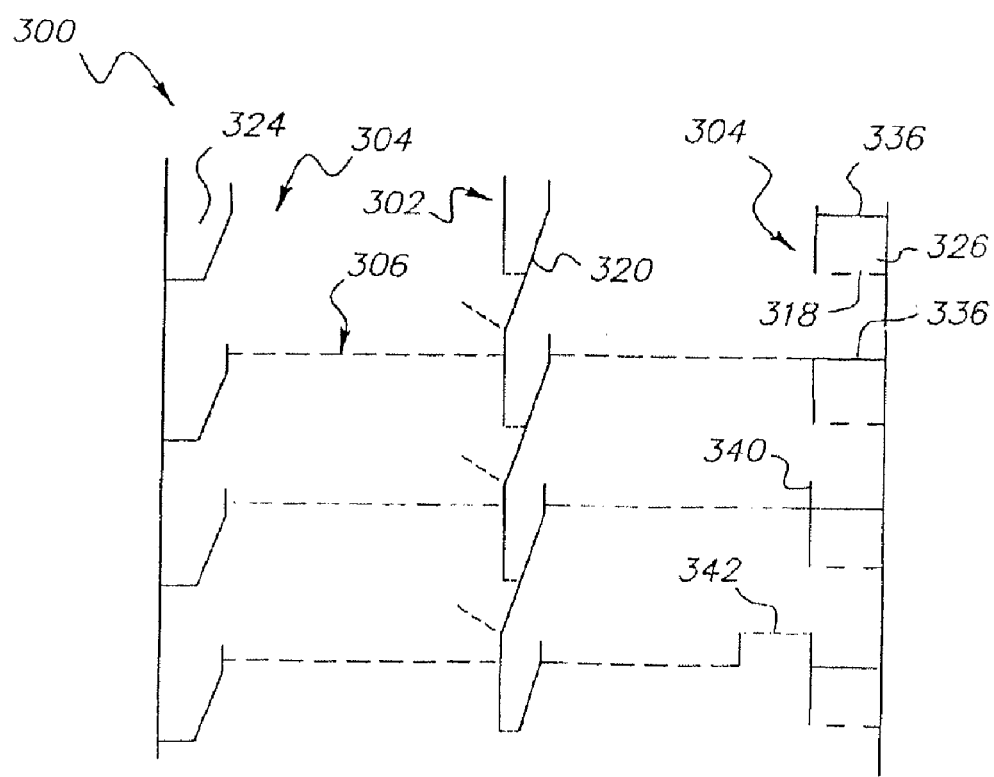

A variation of the side downcomers 304 shown in FIGS. 11A and 11B is that the top of the distribution portion 326 is sealed with a flat plate 336 to prevent the liquid from short cutting from the superior downcomer. Further, the center baffle 308 cooperates with the flat plate 336 to prevent liquid deposited on the flat plate 336 from running into the receiving portion 324. A perforated distribution weir 340 may be included under the distribution portion 326 next to the flat plate 336 of the inferior distribution portion to improve liquid distribution. Alternatively, a bubble promoter 342 may be included instead of the distribution weir 340.

Figure 12:
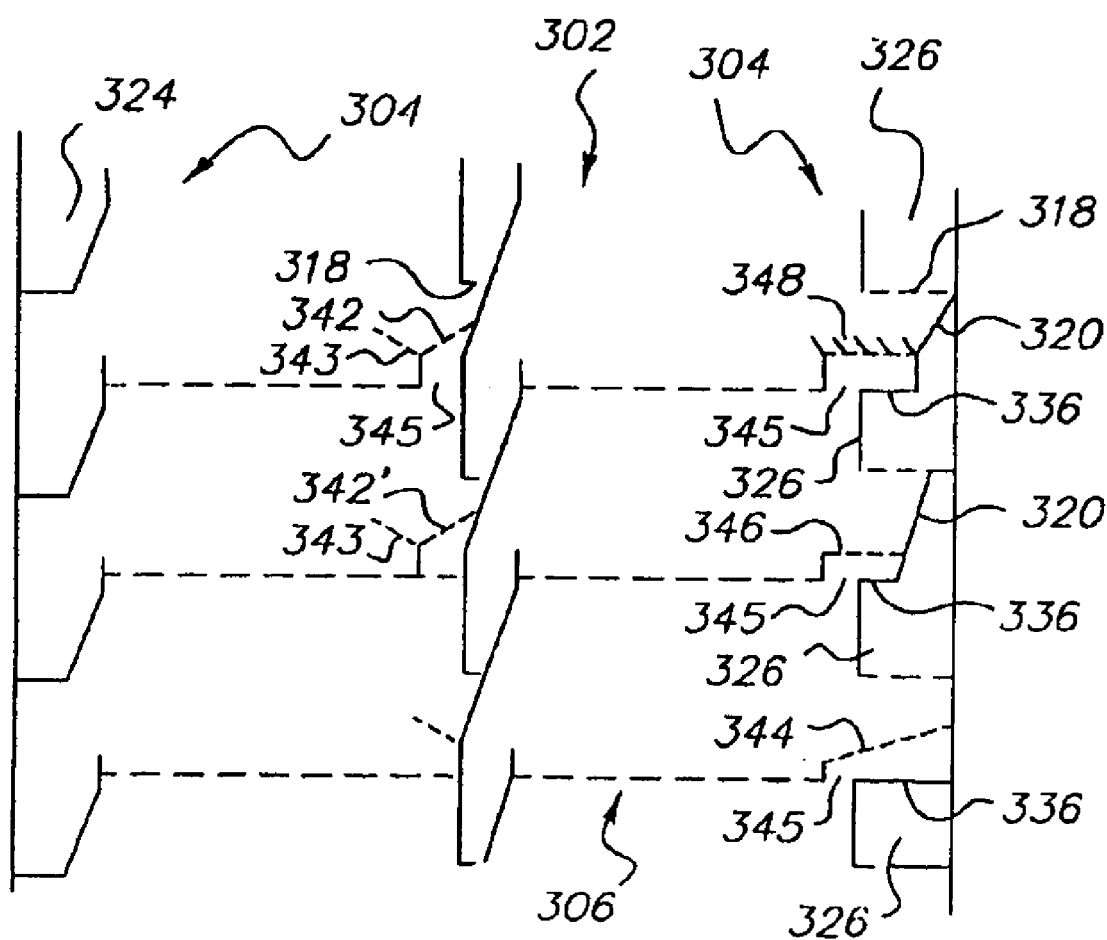

Further methods of maximizing the active area under the distribution portion 326 are shown in FIG. 12. The first means includes a perforated plate 344 positioned at an angle below the distribution portion 326. A gap 345 between the deck 306 and distribution portion 326 allows vapor to enter the area under the plate 344 and the perforations allow the vapor to pass through the plate 344 and mix with the liquid deposited on the plate 344 from the superior distribution portion. Alternatively, a perforated flat plate 346, similar to plate 344, is used in cooperation with an inclined baffle 320. In a further alternative, a perforated plate 348 having a combination of slots, louvers, and/or valves is used. The active area may be further increased by including a bubble promoter 342, with gap 345, below the outlets of the central downcomer 302. The bubble promoters may also include an outlet weir 343. Alternatively, bubble promoter 342' is located below the outlet of the central downcomer 302. Bubble promoter 342' does not include a gap 345, however, the portion of the contacting deck 306 under the bubble promoter 342' has much more fractional perforations than the rest of the deck 306 so that the total open area of the deck 306 covered by the bubble promoter 342' is equivalent to or larger than the total open area of the sloped perforated plate on the top of the bubble promoter 342'. This alternative provides for easier fabrication and installation.

Figure 13:
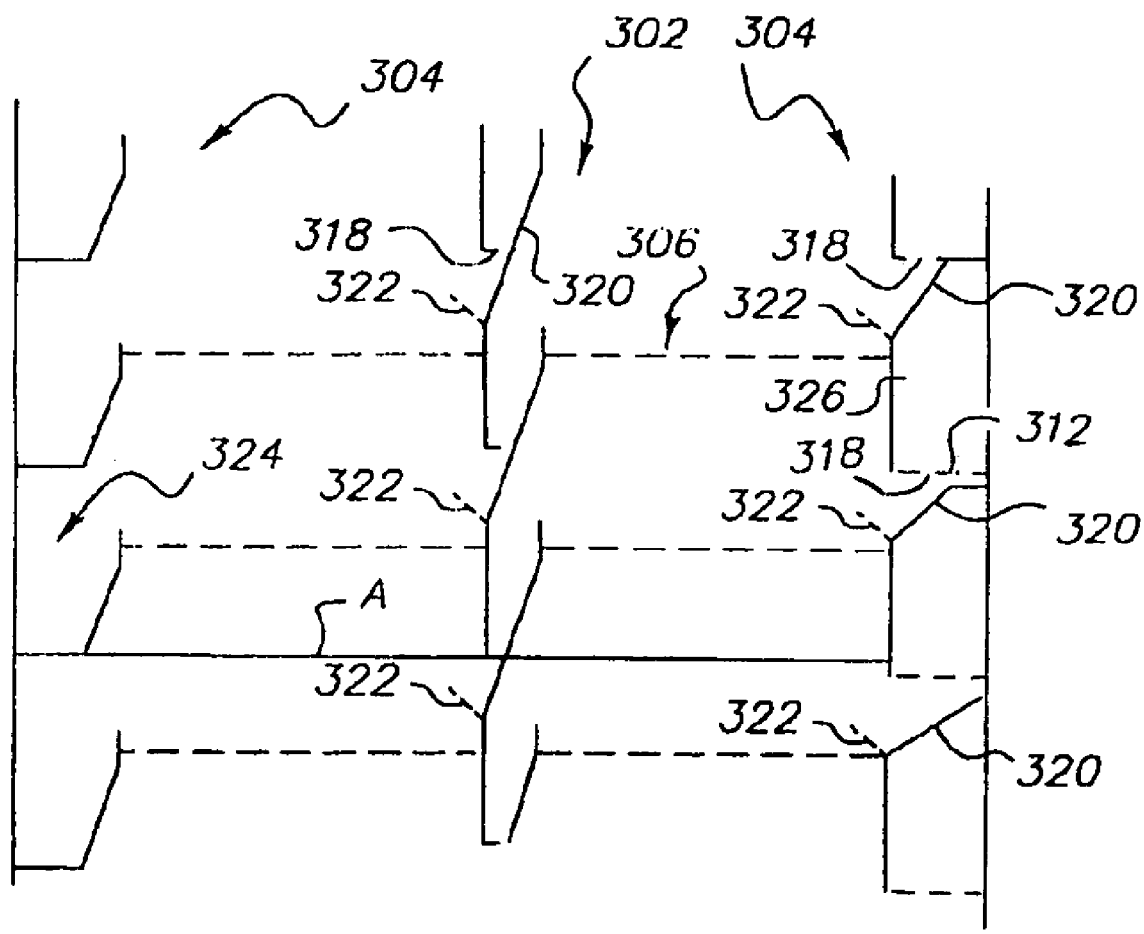

FIG. 13 shows distribution portions 326 having inclined baffles 320 of different inclinations and different distribution weirs 322. The inclined baffles 320 provide increased volume over the distribution portion 326 to improve vapor venting and to reduce downcomer choking, similarly to the inclined baffles associated with the central downcomers 302. With reference to line A, one can also see that the receiving portion 324 and the distribution portion 326 of the side downcomer 304 may be designed with different depths to increase downcomer capacity.

Figure 14:
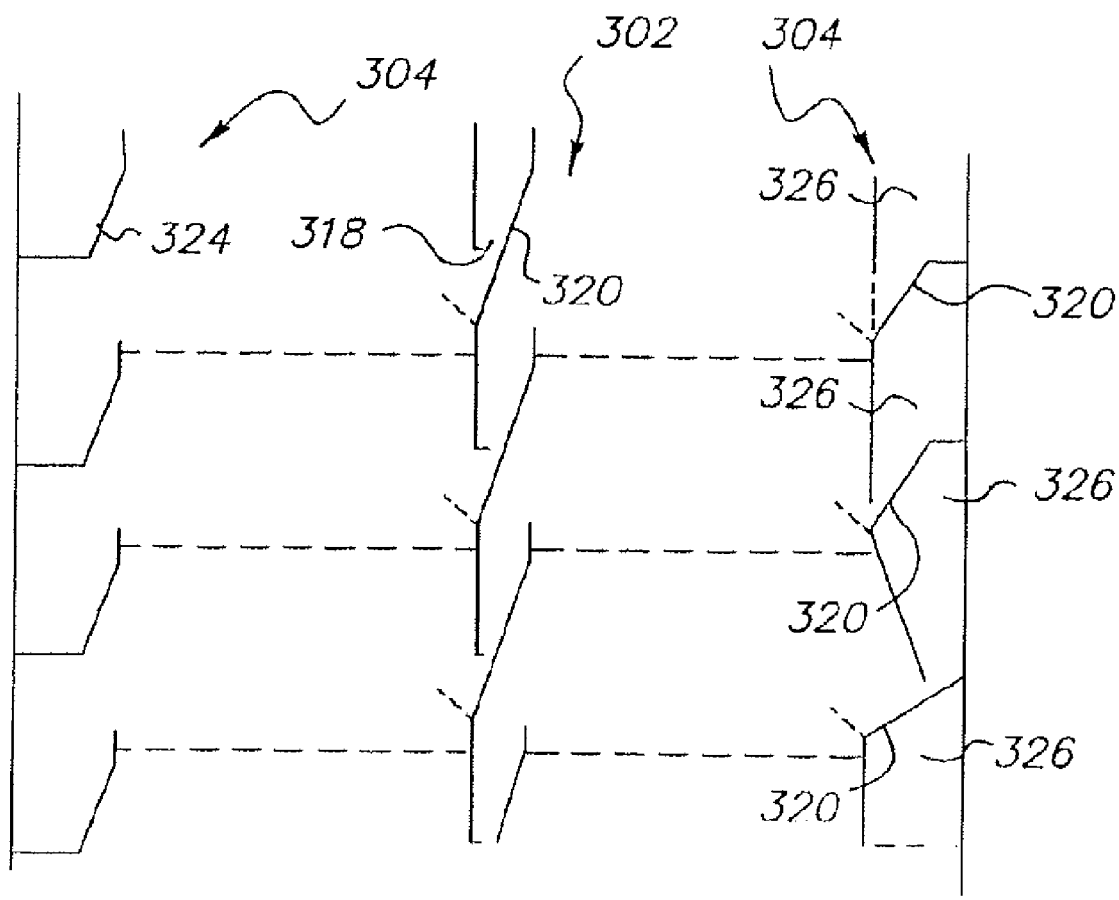

FIG. 14 shows several varying distribution portions 326 that omit the bottom plate 312 and instead have a side wall that extends to close proximity to the inclined baffle 320 directly below the distribution portion 326. The side wall leaves a small gap above the baffle 320 in order to allow liquid to escape the distribution portion 326 and not allow vapor to enter into the side downcomer 304.

While the above described methods may have advantages there may also be advantages in particular applications to increase the active area of tray 300 by simply reducing the area of distribution portion 326.

Figure 15:
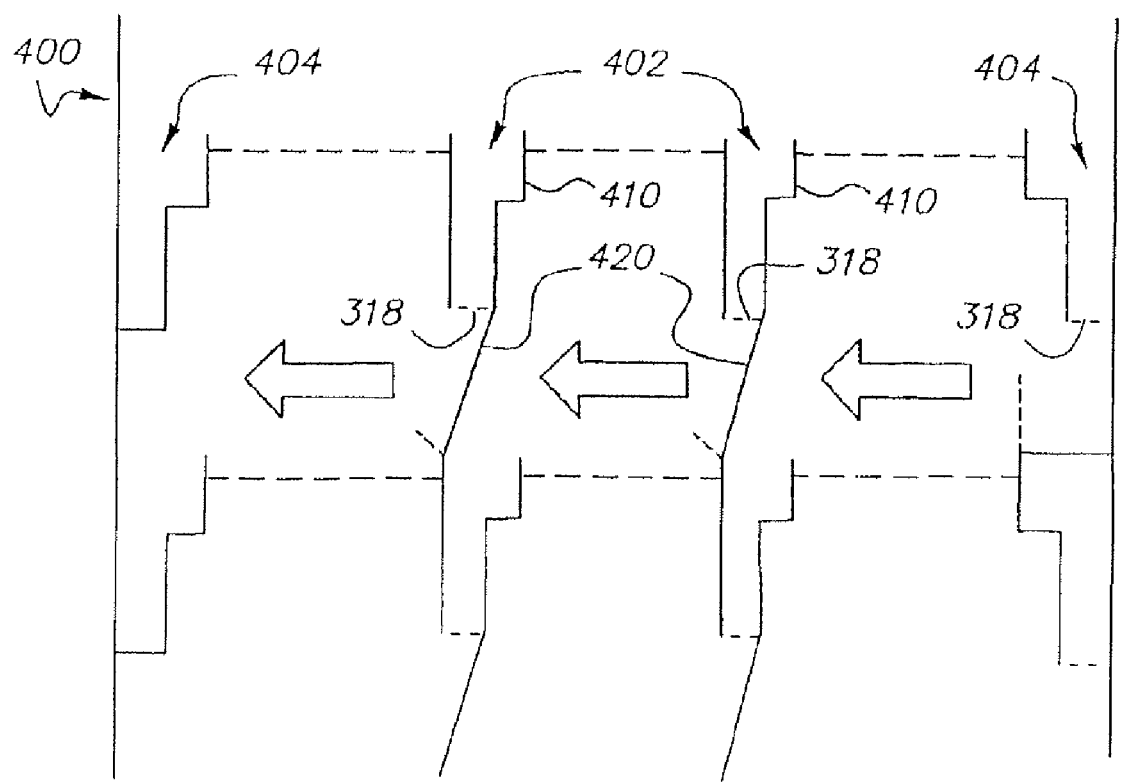
FIGS. 15 and 16 are schematic cross-sectional views of further embodiments of the parallel flow multiple downcomer fractionation tray of the present invention.

The issue of pinching may alternatively be addressed as shown in FIG. 15. The Vapor-liquid contacting tray 400 includes at least one stepped central downcomer 402 and a plurality of stepped side downcomers 404. These stepped downcomers include a stepped side wall 410 that increases the volume over the inlet to an inferior downcomer rather than extending the inclined baffle 420 vertically.

Figure 16:
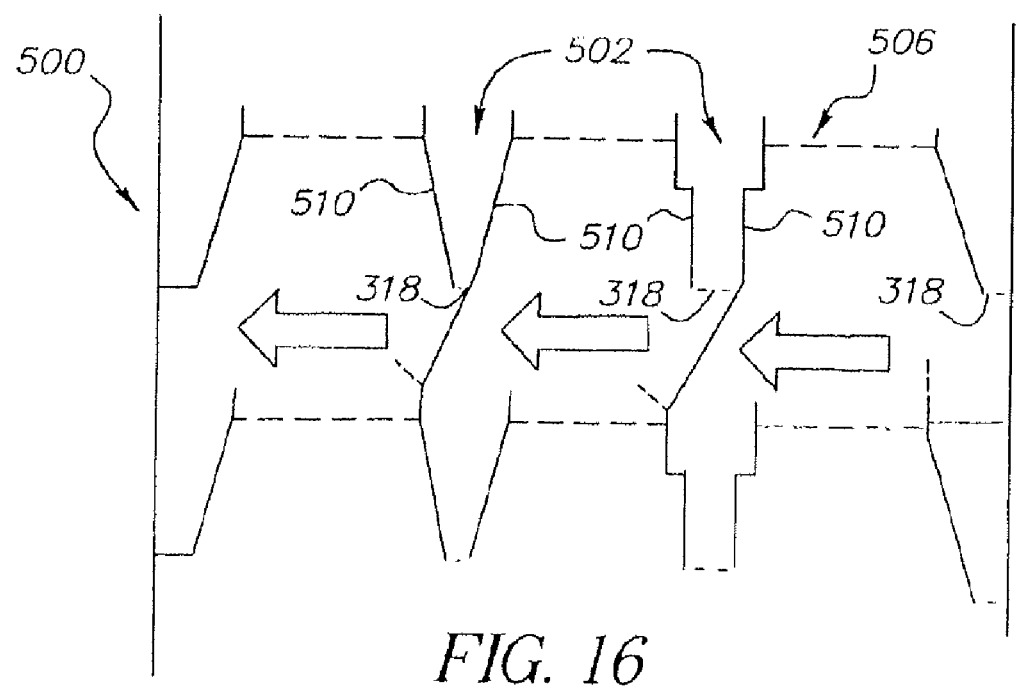

Tray 500, shown in FIG. 16, comprises further variations of the central downcomers 502. Side walls 510 are inclined or stepped on both sides of the downcomer to further increase the volume over the deck portions 506.

It should be noted that although several of the figures show downcomers having differing designs on different trays in the same column, it is expected that trays of a similar design will be used in a single column or a section of a column. It should also be noted that although substantially circular contacting trays are shown and described, other shapes, such as polygonal shapes, may also be imagined.

The physical size of any portion of a parallel flow multiple downcomer tray must be chosen by a skilled designer considering all aspects of the intended operation of the tray. The spacing between vertically adjacent trays will normally be between 20 and 91 centimeters (8-36 inches) and is preferably between 30-61 centimeters (12-24 inches). The total open area of the deck area is generally in the range of about 5 to about 20 percent. For the deck with sieve holes and slots, the normal hole diameter of the circular perforations may range from about 0.3 to about 2.6 centimeters (⅛-1.0 inches). A hole size of about 0.47 to about 0.64 centimeters (³⁄₁₆-¼ inch) is normally preferred. The open area provided by slots is from about 0.25 to about 5 percent of the area of the deck. A representative thickness of the decking is about 0.19 centimeters (0.075 inches) to 0.34 cm (0.14 inches).

The rectangular inlet openings of the central downcomers are normally about 6 to about 25 cm wide (2.5-10 inches). The height of a downcomer as measured from the horizontal top edge of the first side wall to the bottom edge of the first side wall is normally between about 40 to 80% of the spacing between two adjacent trays. This includes the height that the first side wall extends above the decking and below the decking. Thus, the height of the downcomer is equivalent to the overall height of the tallest side wall. The spacing between two adjacent trays is the vertical distance measured between the decking of the two trays. The height of the central liquid/vapor baffle above the decking will normally be approximately 50 to 90% of the spacing between two adjacent trays. The width of the central downcomers may be different from each other depending on their length. The side downcomer is in some embodiments sized such that its top inlet area is similar to top inlet area of the central downcomers.

While the invention has been described with reference to particular embodiments, it will be understood by those skilled in the art that the tray may be designed by combining the elements disclosed above and various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. A vapor-liquid contacting tray comprising:
   a) at least one centrally located downcomer;
   b) an inclined downcomer baffle defining a vertical liquid flow path for liquid flowing through each central downcomer onto a subsequent tray;
   c) a plurality of vapor-liquid contacting decks;
   d) two side downcomers proximate to the outer perimeter of said tray, each side downcomer having a liquid receiving portion and a liquid distributing portion wherein the receiving portion directs liquid to the distributing portion and the distributing portion is substantially sealed against fluid entering directly from a proximate contacting deck; and
   e) a central baffle extending between at least two of said downcomers and intersecting at least one of said contacting decks.

2. The vapor-liquid contacting tray of claim 1, further comprising a stilling deck and weir immediately prior to each of said central downcomers such that liquid must flow over the weir and then stilling deck prior to entering said central downcomers.

3. The vapor-liquid contacting tray of claim 1, further comprising a side downcomer weir immediately prior to the receiving portion.

4. The vapor-liquid contacting tray of claim 3, wherein said central baffle is swept-back and cooperates with an unequally divided side downcomer to increase the length of the side downcomer weir and the entrance space above the receiving portion.

5. The vapor-liquid contacting tray of claim 1, further comprising an anti-penetration weir located at a bottom end of each inclined downcomer baffle, wherein said anti-penetration weir is perforated and oriented substantially perpendicular to the inclined downcomer baffle.

6. The vapor-liquid contacting tray of claim 1, wherein the distribution portion has a different width and height than the receiving portion.

7. The vapor-liquid contacting tray of claim 1, wherein a side wall of the distribution portion extends to close proximity to the top of the downcomer of the next lower tray.

8. The vapor-liquid contacting tray of claim 1, wherein said center baffle further comprises an equalization port that is remote from said side downcomers and said central downcomers.

9. The vapor-liquid contacting tray of claim 1, further comprising a bubble promoter proximate to at least one of an outlet of each of said central downcomers and of the distribution portion of each of said side downcomers.

10. The vapor-liquid contacting tray of claim 1, wherein each of said inclined downcomer baffles comprises a first portion that directs liquid in a first direction and a second portion that directs liquid in a second direction opposite to the first direction.

11. The vapor-liquid contacting tray of claim 10, wherein each of said central downcomers further comprises a liquid balancing box that facilitates fluid communication between the first portion and the second portion of said inclined downcomer baffles.

12. The vapor-liquid contacting tray of claim 1 further comprising perforations defined by the vapor liquid contacting decks; a bubble promoter comprising a perforated plate situated to direct liquid from said inclined downcomer baffle to one of said contacting decks and defining a gap between said contacting deck and the adjacent central downcomer; and a side downcomer bubble promoter comprising a perforated plate situated to direct liquid from the liquid distributing portion to one of said contacting decks.

13. The vapor-liquid contacting tray of claim 1 further comprising a cover over the liquid distributing portion that prevents liquid from a superior side downcomer from entering the liquid distributing portion, said cover also directing vapor in the liquid distributing portion to a vapor flow path between the side downcomer and the outer perimeter of said tray.

14. The vapor-liquid contacting tray of claim 13, wherein the vapor flow path directs vapor to a space above said contacting tray.

15. The vapor-liquid contacting tray of claim 13, wherein said cover defines an inclined baffle directing liquid from superior downcomer to a perforated deck.

16. A vapor-liquid contacting tray of claim 1 wherein the central downcomers are defined at least in part by a first elongate side wall and an opposing second elongate side wall extending a shorter vertical distance below the proximate contacting deck than the first elongate side wall, each central downcomer further comprising a bottom plate that intersects the first elongate side wall, and said inclined downcomer baffle extends from the second elongate side wall, intersects the bottom plate, and extends at least to a vertical plane formed by the first elongate side wall; wherein each of said inclined downcomer baffles comprises a first portion that directs liquid in a first direction and a second portion that directs liquid in a second direction opposite to the first direction.

17. The vapor-liquid contacting tray of claim 16, wherein each of said central downcomers further comprises a liquid balancing box that facilitates fluid communication between the first portion and the second portion of said inclined downcomer baffles.

* * * * *

UNITED STATES PATENT AND TRADEMARK OFFICE
Certificate

Patent No. 7,370,846 B2

Patented: May 13, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Zhanping Xu, Amherst, NY (US); Daniel R. Monkelbaan, Amherst, NY (US); Brian J. Nowak, Orchard Park, NY (US); Robert J. Miller, Houston, TX (US); and Mohamed S. Shakur, Morristown, NJ (US).

Signed and Sealed this Eighth Day of March 2011.

DUANE SMITH
*Supervisory Patent Examiner*
Art Unit 1776
Technology Center 1700